(12) United States Patent
Whelan

(10) Patent No.: US 10,499,613 B1
(45) Date of Patent: Dec. 10, 2019

(54) HEADLOCK LIFT

(71) Applicant: Mark Whelan, Mondovi, WI (US)

(72) Inventor: Mark Whelan, Mondovi, WI (US)

( * ) Notice: Subject to any disclaimer, the term of this patent is extended or adjusted under 35 U.S.C. 154(b) by 293 days.

(21) Appl. No.: 15/452,002

(22) Filed: Mar. 7, 2017

(51) Int. Cl.
| | |
|---|---|
| *A01K 1/062* | (2006.01) |
| *B66D 1/12* | (2006.01) |
| *B66D 1/26* | (2006.01) |
| *B66D 1/60* | (2006.01) |
| *A01K 1/00* | (2006.01) |

(52) U.S. Cl.
CPC ............ *A01K 1/062* (2013.01); *A01K 1/0023* (2013.01); *B66D 1/12* (2013.01); *B66D 1/26* (2013.01); *B66D 1/60* (2013.01); *B66D 2700/025* (2013.01); *B66D 2700/026* (2013.01)

(58) Field of Classification Search
CPC ......... E05F 1/16; E05F 15/681; E05F 15/686; A01K 1/0023; A01K 1/062
USPC ....................... 49/49, 58, 342, 360
See application file for complete search history.

(56) References Cited

U.S. PATENT DOCUMENTS

| | | | | | |
|---|---|---|---|---|---|
| 1,477,493 | A | * | 12/1923 | Hutchinson ............. | A47F 10/00 49/49 |
| 2,189,974 | A | * | 2/1940 | Buford .................. | B61L 29/023 14/52 |
| 2,320,604 | A | * | 6/1943 | Jackson .................... | E06B 3/01 160/190 |
| 3,092,871 | A | | 6/1963 | Marshall et al. | |
| 3,280,508 | A | * | 10/1966 | Dugger ................. | E05F 15/686 49/200 |
| 4,083,149 | A | * | 4/1978 | Hickman ............... | A01K 1/007 49/147 |
| 4,947,800 | A | | 8/1990 | Widney | |
| 5,065,701 | A | | 11/1991 | Punt | |
| 5,271,183 | A | * | 12/1993 | Hahn ..................... | E01F 13/048 49/103 |
| 6,691,463 | B1 | * | 2/2004 | Richmond ........... | A01K 1/0017 119/484 |
| 9,826,710 | B1 | * | 11/2017 | McNew ............... | A01K 1/0035 |
| 2003/0051410 | A1 | * | 3/2003 | Cloutier .................... | G09F 7/20 49/322 |
| 2003/0066492 | A1 | * | 4/2003 | Fransen ............... | A01K 1/0017 119/524 |
| 2011/0302844 | A1 | * | 12/2011 | Morey .................... | E05D 15/16 49/360 |
| 2011/0308744 | A1 | * | 12/2011 | Kicher .................... | E05D 13/12 160/191 |
| 2017/0226765 | A1 | * | 8/2017 | Wastel .................... | E04H 6/424 |

* cited by examiner

*Primary Examiner* — Gregory J Strimbu

(57) ABSTRACT

A headlock lift including a base having a left column and a right column, with each column having a lower side and an upper side. A forward cross-spinning beam and a back cross-spinning beam both connect to the upper side of each column. A moveable gate having a topside, a bottom side, and a plurality of vertical poles fixably attachable to the top side and the bottom side, the moveable gate is slidably received over left and right pipes positioned parallel to the left and right columns. Two pulleys are fixed to the forward cross-spinning beam and two winches are fixed to the back cross-spinning beam. Two cables are continually disposed between the two winches and the two pulleys, with the cables each having a free operating-end attachable to the topside of the moveable gate and a captive-end attachable to a respective one of the winches.

2 Claims, 5 Drawing Sheets

HEADLOCK LIFT

BACKGROUND OF THE INVENTION

Various types of headlock lifts are known in the prior art. However, what has been needed is a headlock lift including a base surface having each of a left column and a right column. What has been further needed is a rotatable forward cross-spinning beam and a rotatable back cross-spinning beam, as well as a moveable gate. Each of the rotatable forward cross-spinning beam and the rotatable back cross-spinning beam is attachable to the each of left column and the right column, respectively. A pair of left and right pulleys and left and right winches are attachable on each of a left side and a right side of the rotatable forward cross spinning beam and the rotatable back cross-spinning beam. Lastly, what has been needed is for each of a left cable and a right cable to be continuously disposed between the left winch to the left pulley and between the right winch to the right pulley, respectively. A gearbox arm mount has a motor configured to be actuated by an operator. The headlock lift thus enables a user to not only separate and sort dairy cattle, but to safely eliminate shoulder pressure that causes pedal bone rotation in dairy cattle during feeding.

FIELD OF THE INVENTION

The present invention relates to a headlock lift, and more particularly, to a headlock lift that can not only separate and sort dairy cattle, but can also safely eliminate shoulder pressure which causes pedal bone rotation in dairy cattle during feeding.

SUMMARY OF THE INVENTION

The general purpose of the headlock lift described subsequently in greater detail, is to provide the headlock lift which has many novel features that result in a headlock lift which is not anticipated, rendered obvious, suggested, or even implied by prior art, either alone or in combination thereof.

To accomplish this, the headlock lift includes a horizontal grounded base having a left vertical column and a right vertical column extending longitudinally, with each vertical column having a lower front side, an upper side, an upper front side, and an upper rear side. Furthermore, the headlock lift has a rotatable forward cross-spinning beam and a rotatable back cross-spinning beam. The headlock lift also has a moveable gate having a left surface, a right surface, a bottom side, a top side, a left top side, a right top side, and a plurality of vertical poles fixably attachable to the top side of the moveable gate and the bottom side of the moveable gate. A pair of fixed pipes extends longitudinally at the lower front side of the left column and the lower front side of the right column.

The left surface of the moveable gate and the right surface of the moveable gate are slidably received over the fixed pipes that extend longitudinally at the lower front side of the left column and the lower front side of the right column. Each of the rotatable forward cross-spinning beam and the rotatable back cross-spinning beam is attachable to each of the left column and the right column, respectively. A set of pulleys and winches are disposed on the left side and right side of the rotatable forward and rotatable back cross-spinning beams.

A left cable is continuously disposed from the left winch to the left pulley, with the left cable having a free operating-end attachable to the left top side of the moveable gate and a captive-end attached to the left winch. The captive end is configured to wind the left cable. A right cable is continuously disposed from the right winch to the right pulley, with the right cable having a free operating-end attachable to the right top side of the moveable gate and a captive-end attached to the right winch. The captive end is configured to wind the right cable. Lastly, a gearbox arm mount is disposed on a right end of the back cross-spinning beam, with the gearbox arm mount having a motor configured to be actuated by an operator.

Thus has been broadly outlined the more important features of the headlock lift so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
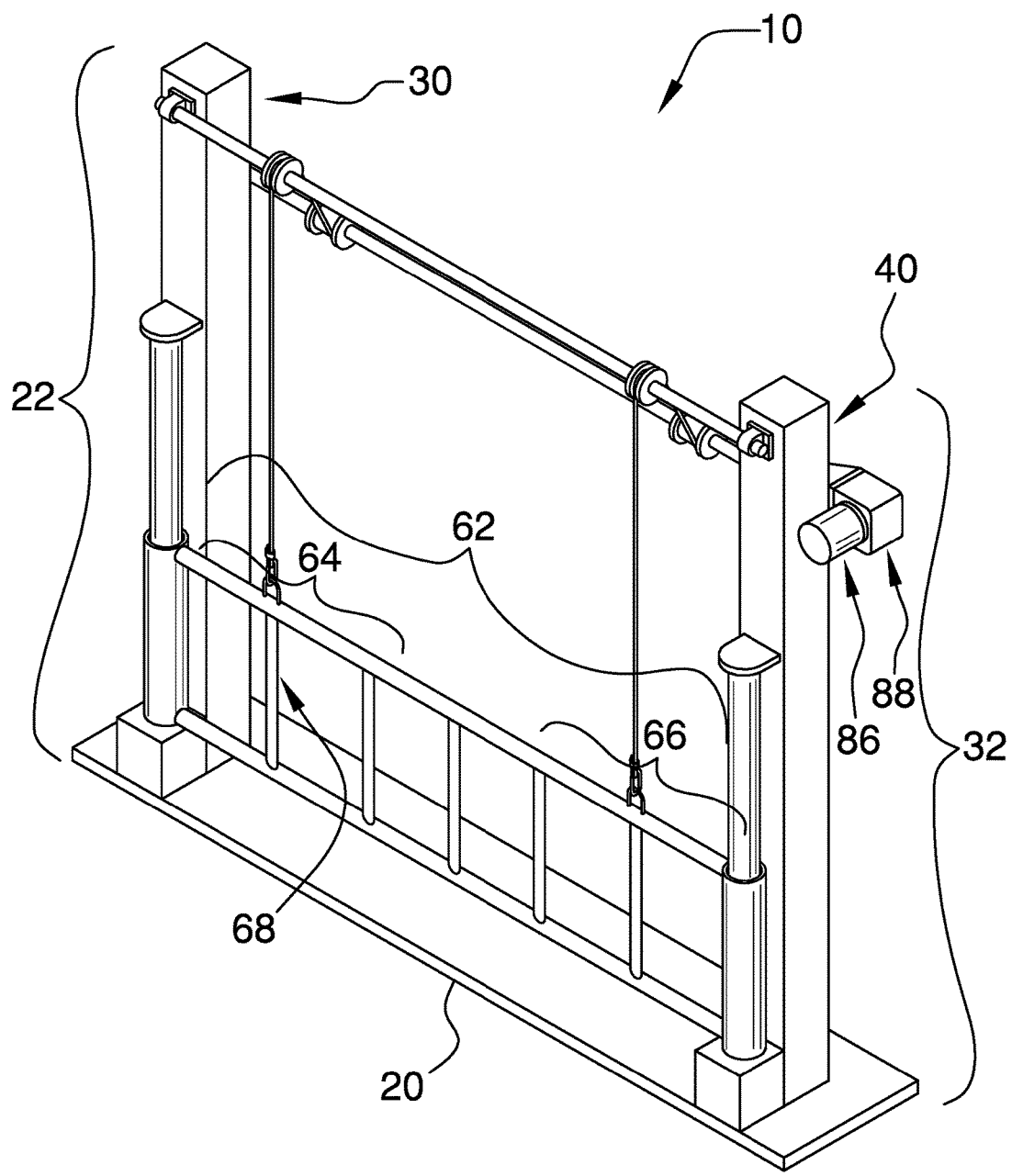
FIG. 1 is a front isometric view.
Figure 2:
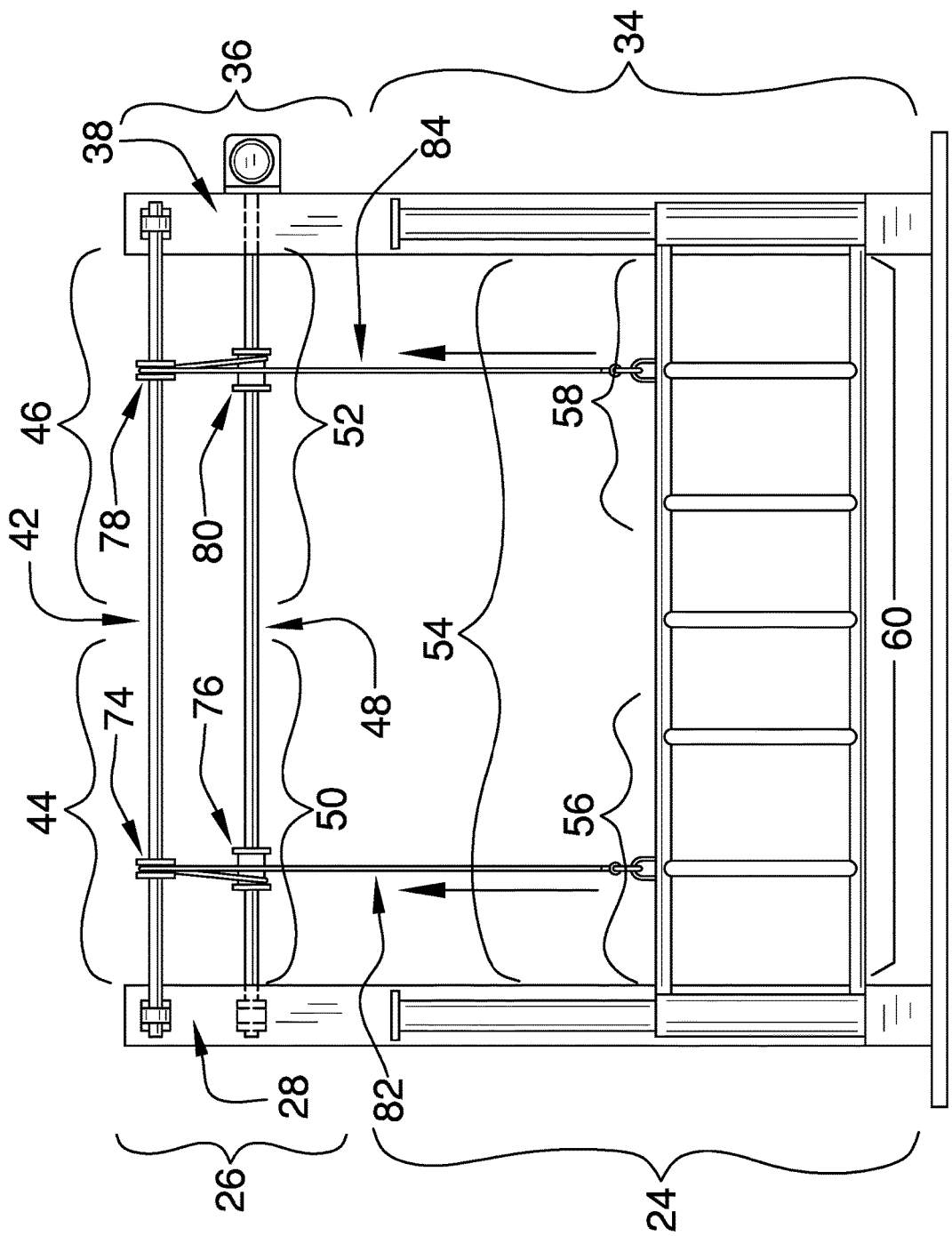
FIG. 2 is a front elevation view.
Figure 3:
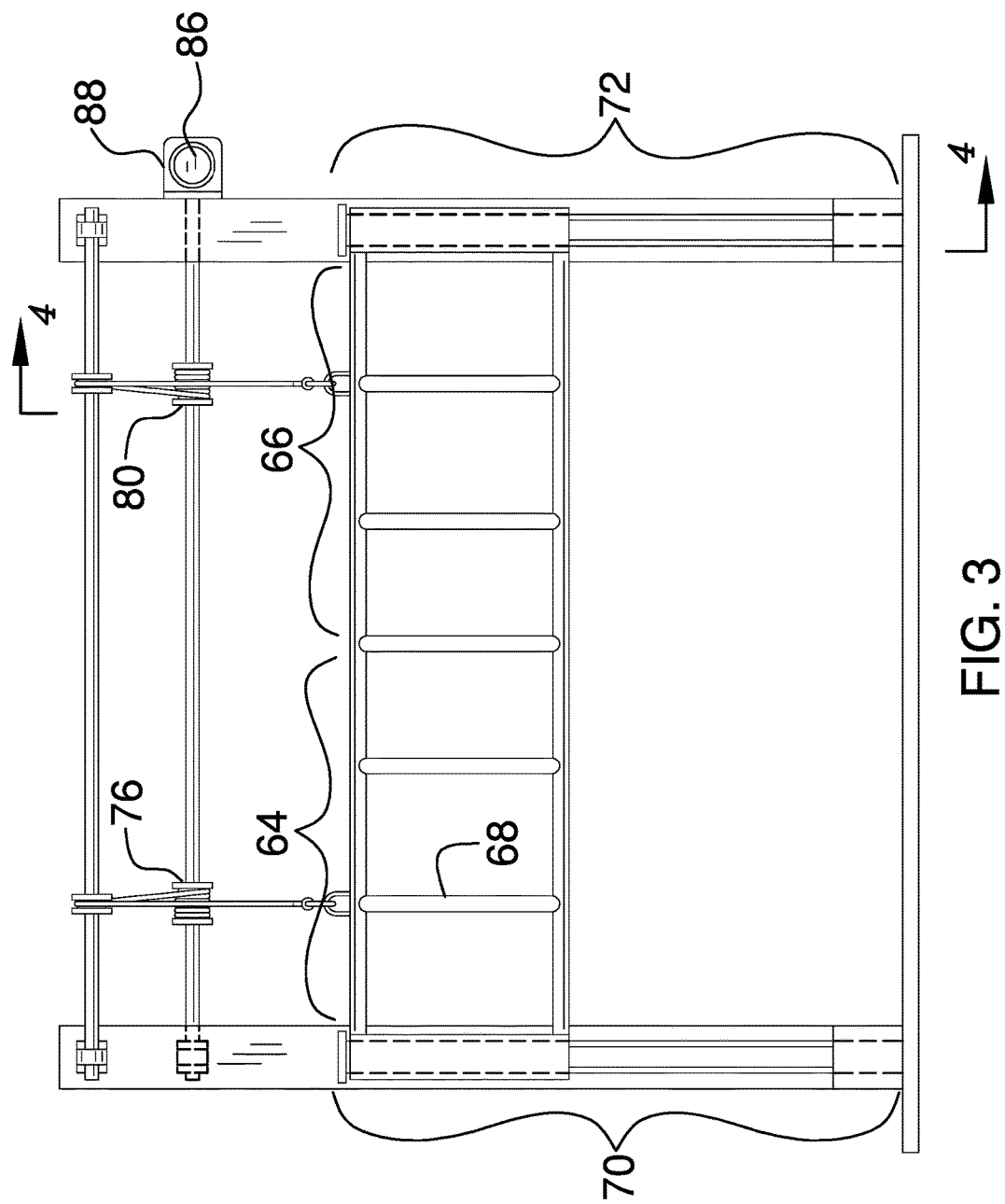
FIG. 3 is a front working elevation view.
Figure 4:
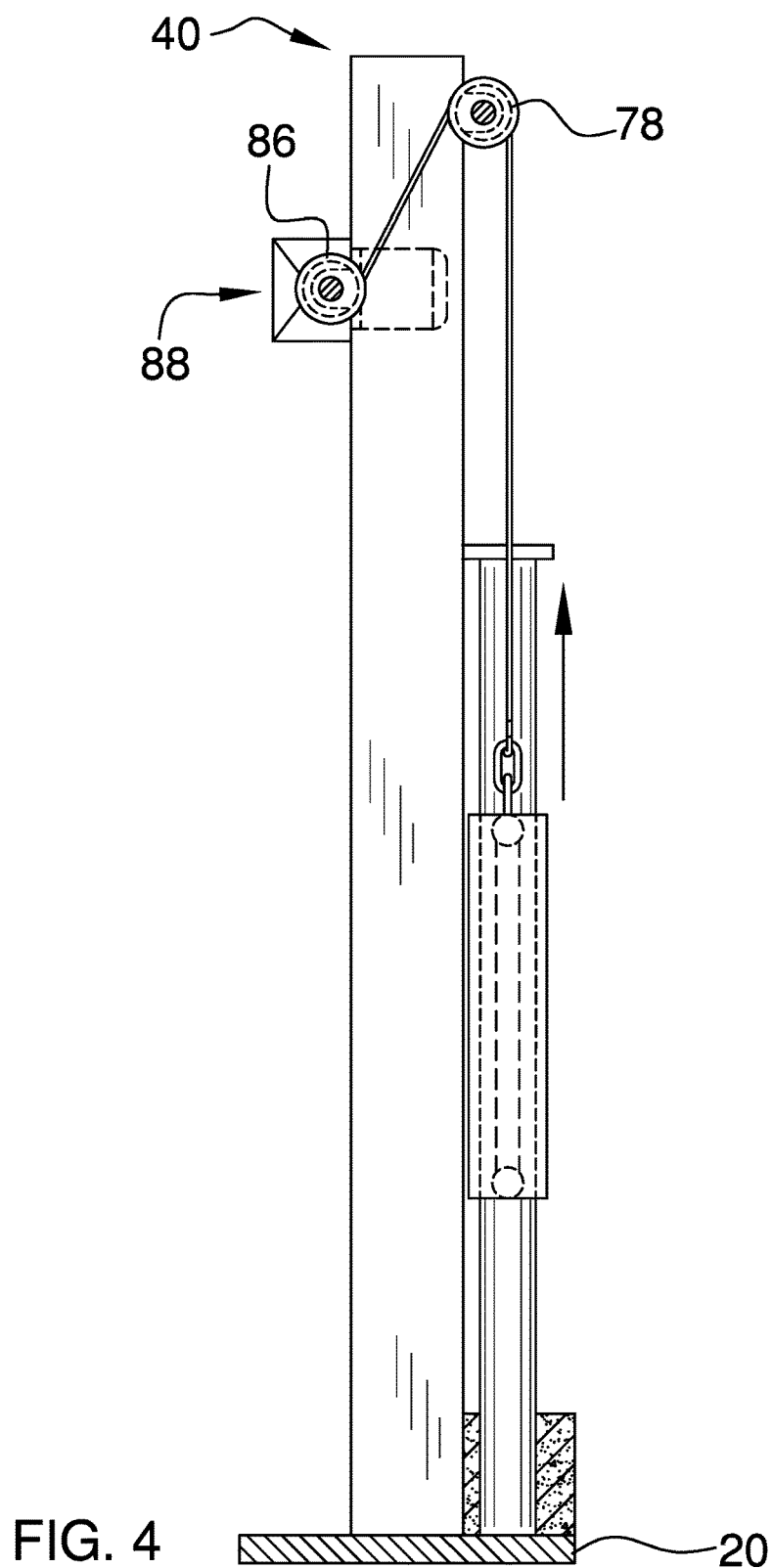
FIG. 4 is a cross-sectional view of a right-side mechanism.
Figure 5:
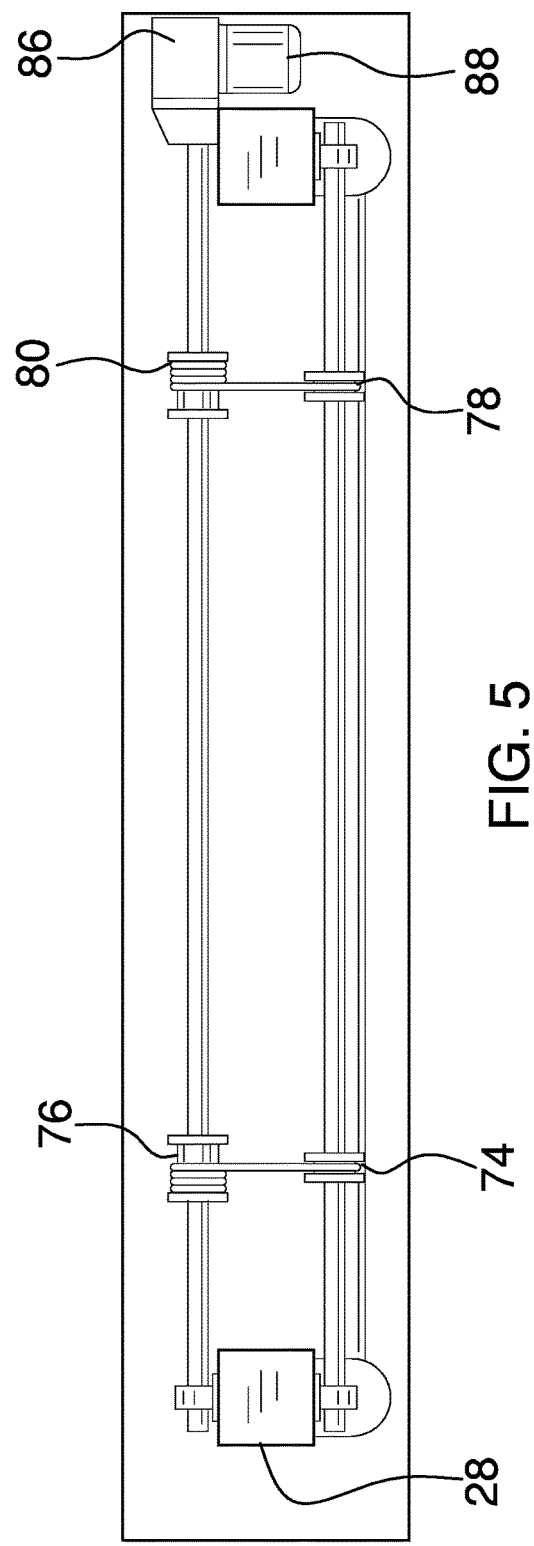
FIG. 5 is a top view.

With reference now to the drawings, and in particular FIGS. 1 through 5 thereof, an example of the headlock lift employing the principles and concepts of the present headlock lift and generally designated by the reference number 10 will be described.

Referring to FIGS. 1 through 5 the present headlock lift 10 is illustrated. The headlock lift 10 includes a horizontal grounded base 20 having a vertical left column 22. The vertical left column 22 has a lower front side 24, an upper side 26, and upper front side 28 and an upper rear side 30. The horizontal grounded base 20 also has a vertical right column 32. The vertical right column 32 has a lower front side 34, an upper side 36, an upper front side 38, and an upper rear side 40. Furthermore, the headlock lift 10 has a rotatable horizontal forward cross-spinning beam 42 having a left side 44 and a right side 46, and a rotatable horizontal forward cross-spinning beam 48 having a left end 50 and a right end 52. The headlock lift 10 further has a rectangular moveable gate 54 having a left surface 56, a right surface 58 a bottom side 60, a top side 62, a left top side 64, a right top side 66, and a plurality of vertical poles 68 fixably attachable to the bottom side 60 of the rectangular moveable gate 54.

The headlock lift 10 further includes a left pipe 70 that is longitudinally disposed on the lower font side 24 of the vertical left column 22, and a right fixed pipe 72 longitudinally disposed on the lower front side 34 of the vertical right column 32. The left surface 56 of the moveable gate 54 is slidably received over the left fixed pipe 70, and the right surface 58 of the moveable gate 54 is slidably received over the right fixed pipe 72. The left side 44 of the rotatable forward cross-spinning beam 42 is attachable to the upper front side 28 of the vertical left column 22, and the right side 46 of the rotatable forward cross-spinning beam 42 is attachable to the upper front side 38 of the vertical right column 32. Similarly, the left end 50 of the rotatable back cross-spinning beam 48 is attachable to the upper rear side 30 of the left column 22, and the right end 52 of the rotatable back cross-spinning beam 48 is attachable to the upper rear side 40 of the vertical right column 32.

The headlock lift 10 further includes a left pulley 74 mounted to the left side 44 of the forward cross-spinning beam 42, and a left winch 76 assembly mounted to the left end 50 of the back cross-spinning beam 48. A right pulley 78 is mounted to the right side 46 of the forward cross-spinning beam 42, and a right winch 80 assembly mounted to the right end 52 of the back cross spinning beam 48. A left cable or scraper rope 82 is continuously disposed from the left winch 76 to the left pulley 74, with the left cable 82 having a free operating-end attachable to the left top side of the moveable gate 54, and a captive-end attached to the left winch 76. The captive end is configured to wind the cable 82. A right cable or scraper rope 84 continuously disposed from the right winch 80 to the right pulley 78, with the right cable 84 having a free operating-end attachable to the right top side of the moveable gate 54, and a captive-end attachable to the right winch 80. The captive end is configured to wind the cable. Finally, a gearbox arm mount 86 is disposed on the right end of the back cross-spinning beam. The gearbox arm mount 86 has a motor 88 configured to be actuated by an operator.

Thus has been broadly outlined the more important features of the headlock lift so that the detailed description thereof that follows may be better understood and in order that the present contribution to the art may be better appreciated.

What is claimed is:

1. A headlock lift comprising:
   a horizontal grounded base having a vertical left column and a vertical right column, wherein the vertical left column has a lower front side, an upper front side, and an upper rear side, and the vertical right column has a lower front side, an upper front side, and an upper rear side;
   a rotatable horizontal forward beam having a left side and a right side;
   a rotatable horizontal back beam having a left end and a right end;
   a rectangular moveable gate having a left surface, a right surface, a bottom side, a top side, and a plurality of vertical poles fixably attached to the top side of the moveable gate and to the bottom side of the moveable gate;
   a left fixed pipe disposed parallel to the lower front side of the vertical left column;
   a right fixed pipe disposed parallel to the lower front side of the vertical right column;
   wherein a left side of the moveable gate is slidably received over the left fixed pipe, and a right side of the moveable gate is slidably received over the right fixed pipe;
   wherein the left side of the forward beam is attached to the upper front side of the left column and the right side of the forward beam is attached to the upper front side of the right column;
   wherein the left end of the back beam is attached to the upper rear side of the vertical left column, and the right end of the back beam is attached to the upper rear side of the vertical right column;
   a left pulley mounted to the left side of the forward beam;
   a left winch assembly mounted to the left end of the back beam;
   a left cable continuously disposed from the left winch assembly to the left pulley, the left cable having a free operating-end attachable to the top side of the moveable gate and a captive-end attached to the left winch assembly, wherein the left winch assembly is configured to wind the left cable thereon;
   a right pulley mounted to the right side of the forward beam;
   a right winch assembly mounted to the right end of the back beam;
   a right cable continuously disposed from the right winch assembly to the right pulley, the right cable having a free operating-end attachable to the top side of the moveable gate and a captive-end attached to the right winch assembly, wherein the right winch assembly is configured to wind the right cable thereon; and
   a gearbox arm mount positioned proximate to the right end of the back beam, the gearbox arm mount having a motor configured to be actuated by an operator.

2. The lift of claim 1, wherein each of the left and right cables is a scraper rope.

* * * * *